(12) United States Patent
Morris et al.

(10) Patent No.: US 10,938,474 B2
(45) Date of Patent: *Mar. 2, 2021

(54) APPROACHES FOR ACHIEVING IMPROVED CAPACITY PLANS FOR A SATELLITE COMMUNICATIONS SYSTEM VIA INTERLEAVED BEAMS FROM MULTIPLE SATELLITES

(71) Applicant: Hughes Network Systems, LLC, Germantown, MD (US)

(72) Inventors: Adrian Morris, Darnestown, MD (US); Dave Roos, Boyds, MD (US); Stan Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,255

(22) Filed: Oct. 15, 2019

(65) Prior Publication Data

US 2020/0059297 A1 Feb. 20, 2020

Related U.S. Application Data

(63) Continuation of application No. 15/451,307, filed on Mar. 6, 2017, now Pat. No. 10,477,385.
(Continued)

(51) Int. Cl.
*H04W 40/20* (2009.01)
*H04B 7/12* (2006.01)
(Continued)

(52) U.S. Cl.
CPC ............ *H04B 7/2041* (2013.01); *H04B 7/12* (2013.01); *H04B 7/1851* (2013.01); *H04L 29/06* (2013.01);
(Continued)

(58) Field of Classification Search
CPC ...... H04B 7/2041; H04B 7/12; H04B 7/1851; H04B 7/18515; H04L 1/0071; H04L 29/06; H03M 13/6552
See application file for complete search history.

(56) References Cited

U.S. PATENT DOCUMENTS

| 4,823,341 A | 4/1989 | Rosen |
| 5,473,601 A | 12/1995 | Rosen et al. |

(Continued)

FOREIGN PATENT DOCUMENTS

WO   WO1988001456 A1   2/1988

OTHER PUBLICATIONS

USPTO, "International Search Report & Written Opinion", PCT/US2017/021008, dated Nov. 16, 2017.
(Continued)

*Primary Examiner* — Dong-Chang Shiue
(74) *Attorney, Agent, or Firm* — Potomac Technology Law, LLC

(57) ABSTRACT

A method is provided for interleaving frequency reuse plans of multiple satellites to form an aggregate frequency reuse cell plan. A first plurality of spot beams is generated by a first satellite for a first frequency reuse plan based on radio frequency (RF) spectrum bands. A second plurality of spot beams is generated by a second satellite for a second frequency reuse plan based on the RF spectrum bands. The first and second plurality of spot beams are interleaved to generate an aggregate frequency reuse cell plan. According to the aggregate frequency reuse plan, each of a first plurality of cells is covered by a combination of at least two of the plurality of spot beams of the first satellite, and each of a first plurality of cells is covered by a combination of at least two of the plurality of spot beams of the second satellite.

6 Claims, 15 Drawing Sheets

Related U.S. Application Data

(60) Provisional application No. 62/304,121, filed on Mar. 4, 2016.

(51) Int. Cl.
  *H04B 7/204* (2006.01)
  *H04L 29/06* (2006.01)
  *H04B 7/185* (2006.01)
  *H03M 13/00* (2006.01)
  *H04L 1/00* (2006.01)

(52) U.S. Cl.
  CPC ........ *H04W 40/20* (2013.01); *H03M 13/6552* (2013.01); *H04B 7/18515* (2013.01); *H04L 1/0071* (2013.01)

(56) References Cited

U.S. PATENT DOCUMENTS

| | | |
|---|---|---|
| 5,485,464 A | 1/1996 | Strodtbeck |
| 7,200,360 B1 | 4/2007 | Chang et al. |
| 7,382,743 B1 | 6/2008 | Rao et al. |
| 7,436,370 B2 | 10/2008 | Blanton |
| 7,773,942 B2 | 8/2010 | Hudson et al. |
| 2002/0041575 A1* | 4/2002 | Karabinis .......... H04B 7/18539 370/319 |
| 2002/0090942 A1 | 7/2002 | Karabinis et al. |
| 2004/0192376 A1* | 9/2004 | Grybos ............. H04B 7/18519 455/552.1 |
| 2008/0055151 A1 | 3/2008 | Hudson et al. |
| 2008/0056176 A1 | 3/2008 | Hudson et al. |
| 2008/0233865 A1 | 9/2008 | Malarky et al. |
| 2011/0268017 A1 | 11/2011 | Miller |
| 2012/0147812 A1 | 6/2012 | Hudson et al. |
| 2014/0295752 A1* | 10/2014 | Dankberg .......... H04B 7/18519 455/12.1 |
| 2016/0254855 A1 | 9/2016 | Tong et al. |
| 2017/0070308 A1 | 3/2017 | Hahn et al. |
| 2018/0014261 A1 | 1/2018 | Miranda et al. |

OTHER PUBLICATIONS

USPTO, "International Search Report and Written Opinion", PCT/US2018/019979, dated May 15, 2018.

\* cited by examiner

US 10,938,474 B2

APPROACHES FOR ACHIEVING IMPROVED CAPACITY PLANS FOR A SATELLITE COMMUNICATIONS SYSTEM VIA INTERLEAVED BEAMS FROM MULTIPLE SATELLITES

RELATED APPLICATIONS

This application is a continuation, and claims the benefit of the earlier filing date under 35 U.S.C. § 120, from U.S. application Ser. No. 15/451,307 (filed 2017 Mar. 6), which claims priority under 35 U.S.C. § 119 based on U.S. Provisional Application Ser. No. 62/304,121 (filed Mar. 4, 2016), the entireties of which are incorporated by reference herein.

BACKGROUND

Multi-beam communications satellites (e.g., spot beam satellites) are designed such that a given geographic coverage area is serviced by a pattern of beams. With such multi-beam satellites, in order to avoid or minimize inter-beam interference, certain frequency reuse principles must be applied to the bream patterns of the antenna design. One of the primary guidelines for the beam pattern is that a frequency and polarization combination of one beam cannot be "reused" within a certain distance from another beam of the same frequency and polarization combination. The distance between beams is generally specified as the distance between beam centers of two beams of a same color (two beams of the same frequency band and polarization), where the distance is quantified in terms of the radius r of the beams. If the minimum distance requirements are not followed with regard to two such beams, then the beams will cause unacceptable levels of interference between them. The beam pattern design is commonly referred to as a frequency reuse pattern, where each polarization/frequency pair is diagrammatically reflected by a beam color (or pattern in the case of the black and white figures included herein). In typical systems, a reuse of four means that a set of four adjacent beams will have disjoint frequency and polarization assignments such that none of the beams of each set interfere with each other. In other words, adjacent sets of four beams separate the beams sharing a common frequency and polarization such that (even though they are reusing the same frequency and polarization assignments) the beams of one set will not excessively interfere with the respective beams of an adjacent set.

For example, FIG. 1A illustrates a typical 4-beam reuse pattern of a single satellite 110, where, for example, the striped pattern of the cell 101 on the ground reflects a right-hand polarization of a first frequency or frequency band, the dot pattern of the cell 103 reflects a left-hand polarization of the same frequency band as that of 101, the checkered pattern of the cell 105 reflects a right-hand polarization of a second frequency or frequency band, and the brick pattern of the cell 107 reflects a left-hand polarization of the same frequency band as that of the cell 105. In such a four-color reuse pattern, the distance between the beam centers of two beams of the same color are $2\sqrt{3}*r$ apart, where r is the center-to-vertex radius of the hexagonal beam. As a further example, FIG. 1B illustrates a typical 3-color reuse pattern, where (similar to the 4-beam reuse pattern of FIG. 1A) each of the ground cell patterns 111, 113, 115 reflects a particular beam frequency/polarization assignment. In such a three-color reuse pattern, the distance between the beam centers of two beams of the same color are $3*r$ apart, again where r is the center-to-vertex radius of the hexagonal beam. Accordingly, as illustrated by these Figures, each group of four or three particular polarization/frequency beams is geographically arranged such that a beam of a particular polarization/frequency is not adjacent to any beam of the same polarization/frequency (where such beam pairs of a same polarization/frequency are separated by a required minimum distance).

FIG. 1C illustrates typical frequency band and polarization assignments for the beams of FIG. 1A. With reference to FIGS. 1A and 1C, the satellite 110 (via the downlink antennae 110a, 110b, 110c, 110d) transmits the downlink beams A, B, C, D. Each beam A comprises the RHP for the Ka downlink frequency bands 18.3-18.8 GHz (500 MHz of spectrum for each such beam), each beam B comprises the RHP for the Ka downlink frequency bands 19.7-20.2 GHz (500 MHz of spectrum for each such beam), each beam C comprises the LHP for the Ka downlink frequency bands 18.3-18.8 GHz (500 MHz of spectrum for each such beam), and each beam D comprises the LHP for the Ka downlink frequency bands 19.7-20.2 GHz (500 MHz of spectrum for each such beam).

FIG. 1D illustrates a block diagram of a typical configuration for two transmitters of a satellite downlink antenna, configured to transmit one set of the A, B, C, D (or 1, 2, 3, 4) beams of a four-color reuse pattern. With reference to FIG. 1A, each of the beams of the four-color reuse pattern corresponds a respective one of the beams A, B, C, D (as transmitted by a respective transmitter of FIG. 1D). Each of the transmitters comprises an amplifier 131, 151 (e.g., a traveling wave tube amplifier (TWTA)) and a filter 133, 153. For example, the A and B beams are amplified via the TWTA 131 and the C and D beams are amplified by the TWTA 151. The amplified A+B and C+D beams are then fed into the filters 133, 153, respectively. Each filter splits the combined input into two outputs. Each output connects to an antenna feed designed to transmit the A, B, C, or D beams with either right hand or left hand circular polarization. For example, with reference to FIG. 1D, beams of opposite circular polarization—a right-hand polarized A beam and a right-hand polarized B beam via the filter 133, and a left-hand polarized C beam and a left-hand polarized D beam via the filter 153.

Satellite systems are generally designed to maximize capacity by using all of the available spectrum. For example, if 1000 MHz of spectrum (in both polarizations—right-hand polarization (RHP) and left-hand polarization (LHP)) is available for a particular system, the system theoretically has 2000 MHz of available spectrum for each beam group. With reference to the 4-pattern reuse system of FIG. 1A, for example, each beam represented by the pattern 101 may comprise a RHP of the frequency band 18.3-18.8 GHz, each beam represented by the pattern 103 may comprise a LHP of the frequency band 18.3-18.8 GHz, each beam represented by the pattern 105 may comprise a RHP of the frequency band 19.7-20.2 GHz, and each beam represented by the pattern 107 may comprise a LHP of the frequency band 19.7-20.2 GHz. Each beam would thereby comprise 500 MHz of spectrum or bandwidth, for a total available capacity of 2,000 MHz within each 4-beam group. The reuse pattern can be repeated as many times as desired, up to a maximum desired coverage region, as limited by applicable physical constraints, such as total power and mass limits of the overall satellite payload. The total system bandwidth is then the sum of the individual bandwidths of all the beams.

The size of a spot beam is determined primarily by the size of the antenna on the satellite—the larger the antenna, the smaller the spot beam. Further, as would be recognized by one of skill in the art, in order to achieve reasonably acceptable RF performance, the number of beams and the reuse pattern employed will impose certain payload design requirements, such as the number of antennae and the size of each antenna required to implement the desired beam pattern. To cover the eastern half of the continental United States (CONUS), for example, one might design a satellite payload with 50 beams, each of approximately 0.5 degrees diameter, using a three-color reuse pattern. The antennas of such a payload might each be approximately 2.5 m in diameter and three or even four such antennae (e.g., 110a, 110b, 110c, 110d) may be required to achieve desired RF performance. Each beam may be assigned 666 MHz, yielding a total of 33.3 GHz of bandwidth. Accordingly, the desired number of beams, reuse pattern and total capacity will contribute to payload size, weight and power requirements, which in turn will drive up the satellite manufacturing and launch costs.

Moreover, in practice, the distribution of users and associated capacity demand within the cell coverage area is non-uniform, which drives the goal of a satellite system design to provide a corresponding non-uniform distribution of capacity density to satisfy the respective demand. Accordingly, in recent times, some satellite system designs have attempted to solve capacity density requirements by deploying such satellite technologies as steerable beams. FIG. 1E illustrates the four pattern reuse plan of FIG. 1A, where the beams 1, 2, 3, 4 represent the respective cell patterns 101, 103, 105, 107 on the ground, and the beam pattern has been overlaid on a map of the Northeastern United States. As further illustrated in FIG. 1E, in order to provide higher capacity density to the New York/Long Island, Southern Connecticut and Boston areas, certain of the beams have been steered to double the capacity over these regions (e.g., the 3 beam 121 has been moved to the cell 122, the 1 beam 123 has been moved to the cell 124, the 3 beam 125 has been moved to the cell 126, and the 2 beam 127 has been moved to the cell 128). Accordingly, the capacity density has been adjusted to double the spectrum/capacity delivered to the cells 122, 124, 126, 128. This capacity density adjustment, however, has been achieved at the expense of the capacity delivered to the cells 121, 123, 125, 127—as spectrum cannot be provided to these cells without violating the adjacent cell polarization/frequency requirements.

An alternative design may provide for a higher per-beam spectrum allocation. In view of such constraints as satellite size, weight and power, however, such a design would limit the total number of beams available at the higher spectrum allocation. Further, providing for such high capacity beams also significantly increases satellite complexity. Accordingly, with this design, there may not be enough user beams to cover the contiguous United States, and thus the capacity would have to be provided to the higher density population areas at the expense of having no capacity provided to the lower density population areas (e.g., providing user beams over only the Eastern and Western coasts of the United States. Accordingly, again, the desired capacity density allocation is achieved at the expense of being unable to provide capacity to certain geographic regions.

What is needed, therefore, are approaches for a satellite communications system that provides for spot beams of increased capacity density without sacrificing capacity in adjacent beams and without overly increasing satellite size, weight, power and complexity constraints.

A significant contributor to the system cost of a satellite system is the launch cost. Recently, new launch services providers have become viable that are capable of launching smaller conventional satellites for competitive costs. There is now a market for launching large satellites as described above as well as multiple smaller satellites.

Some Example Embodiments

The present invention advantageously addresses the foregoing requirements and needs, as well as others, by providing approaches for a satellite communications system that employs spot beams of increased capacity density without sacrificing capacity in adjacent beams and without overly increasing satellite size, weight, power and complexity constraints.

In accordance with example embodiments, a method is provided for interleaving the frequency reuse plans of at least two satellites to form an aggregate frequency reuse cell plan. A first plurality of spot beams is generated by a first satellite for a first frequency reuse plan based on a plurality of radio frequency (RF) spectrum bands. A second plurality of spot beams is generated by a second satellite for a second frequency reuse plan based on the plurality of RF spectrum bands. The first plurality of spot beams and the second plurality of spot beams are interleaved to generate an aggregate frequency reuse cell plan. According to the aggregate frequency reuse plan, (i) each of a first plurality of cells is covered by a combination of at least two of the plurality of spot beams of the first satellite, and (ii) each of a first plurality of cells is covered by a combination of at least two of the plurality of spot beams of the second satellite. According to a further embodiment of the method, according to the aggregate frequency reuse cell plan, each of a third plurality of cells is covered by a combination of at least two of the plurality of spot beams of the first satellite and a combination of at least two of the plurality of spot beams of the second satellite. According to a further embodiment of the method, according to the aggregate frequency reuse cell plan, each of a third plurality of cells is covered by at least one of the plurality of spot beams of the first satellite and at least one of the plurality of spot beams of the second satellite. According to a further embodiment of the method, according to the aggregate frequency reuse cell plan, each of a third plurality of cells is covered by a combination of at least a first two of the plurality of spot beams of the first satellite and a combination of at least a first two of the plurality of spot beams of the second satellite, and each of a fourth plurality of cells is covered by a combination of at least a second two of the plurality of spot beams of the first satellite and a combination of at least a second two of the plurality of spot beams of the second satellite.

In accordance with further example embodiments, a system is provided for interleaving the frequency reuse plans of at least two satellites to form an aggregate frequency reuse cell plan. A first satellite includes at least one antenna configured to generate a first plurality of spot beams that form a first frequency reuse plan based on a plurality of radio frequency (RF) spectrum bands. A second satellite includes at least one antenna configured to generate a second plurality of spot beams that form a second frequency reuse plan based on the plurality of RF spectrum bands. The at least one antenna of the first satellite and the at least one antenna of the second satellite are further configured to generate the first plurality of spot beams and the second plurality of spot beams, respectively, in an interleaved manner to generate an aggregate frequency reuse cell plan. According to the aggregate frequency reuse cell plan, (i) each of a first plurality of cells is covered by a combination of at least two of the plurality of spot beams of the first satellite, and (ii) each of a first plurality of cells is covered by a combination of at least two of the plurality of spot beams of the second satellite. According to a further embodiment of the system, according to the aggregate frequency reuse cell plan, each of a third plurality of cells is covered by a combination of at least two of the plurality of spot beams of the first satellite and a combination of at least two of the plurality of spot beams of the second satellite. According to a further embodiment of the system, according to the aggregate frequency reuse cell plan, each of a third plurality of cells is covered by at least one of the plurality of spot beams of the first satellite and at least one of the plurality of spot beams of the second satellite. According to a further embodiment of the system, according to the aggregate frequency reuse cell plan, each of a third plurality of cells is covered by a combination of at least a first two of the plurality of spot beams of the first satellite and a combination of at least a first two of the plurality of spot beams of the second satellite, and each of a fourth plurality of cells is covered by a combination of at least a second two of the plurality of spot beams of the first satellite and a combination of at least a second two of the plurality of spot beams of the second satellite.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Approaches for a satellite communications system that employs spot beams of increased capacity density, without sacrificing capacity in adjacent beams and without overly increasing satellite size, weight, power and complexity constraints, are provided. In accordance with example embodiments of the present invention, a satellite system employs multiple satellites, where the beams of each of the individual satellites are interleaved over the cell coverage area to provide increased system capacity density. Further, because the system utilizes different satellites deployed at different respective orbital slots, each satellite can reuse the same spectrum without restrictions on frequency reuse as between the different satellites since the satellites will be placed in different orbital locations. Those or ordinary skill in the art would recognize that the same frequency and polarization can be transmitted to the same satellite terminal (ST) from different orbital slots without excessive interference by advantageously using the transmit and receive antenna discrimination of the ST.

Figure 2:
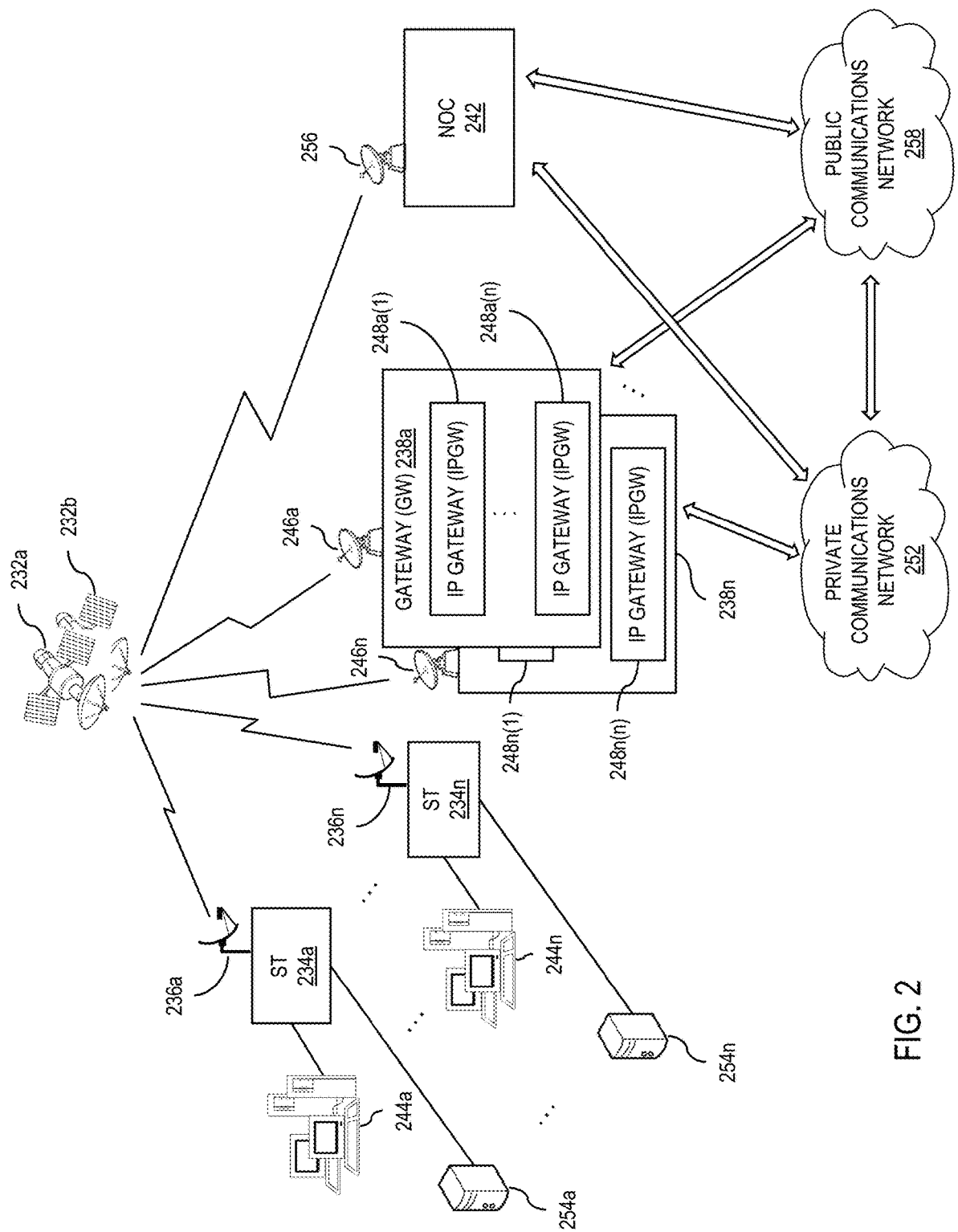
FIG. 2 illustrates an example satellite communications system capable of providing approaches for a satellite communications system that employs spot beams of increased capacity density, in accordance with example embodiments of the present invention.

FIG. 2 illustrates an example satellite communications system capable of providing approaches for a satellite communications system that employs spot beams of increased capacity density, in accordance with example embodiments of the present invention.

The satellite communications system includes one or more satellites (of which two are shown in the Figure—satellites 232a and 232b) that support communications among multiple satellite terminals (STs) 234a-234n, a number of gateways (GWs) 238a-238n, and a network operations center (NOC) 242. The STs, GWs and NOC transmit and receive signals via the antennas 236a-236n, 246a-246n, and 256, respectively. According to different embodiments, the NOC 242 may reside at a separate site reachable via a separate satellite channel or may reside within a GW site. The NOC 242 performs the management plane functions of the system 230, while the GWs 238a-238n perform the data plane functions of the system 230. For example, the NOC 242 performs such functions as network management and configuration, software downloads (e.g., to the STs 234a-234n), status monitoring, statistics functions (e.g., collection, aggregation and reporting), security functions (e.g., key generation, management and distribution), ST registration and authentication, and GW diversity management. The NOC 242 communicates with each GW via the satellite 232, or via a secure private communications network 252 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 238a-238n include one or more IP gateways (IPGWs)—whereby the data plane functions are divided between a GW and its respective IPGWs. For example, GW 238a includes IPGWs 248a(1)-248a(n) and GW 238n includes IPGWs 248n(1)-248n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Here, the terminology "inroute" (or return link) refers to a data communications link from an ST to a respective GW over a respective satellite, and the term "outroute" (or forward link) refers to a link from a GW to one or more STs over a respective satellite. An inroute manager or inroute group manager (IGM) (not shown) may be located at each of the gateways. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 242, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 242. The STs 234a-234n provide connectivity to one or more hosts 244a-244n and/or routers 254a-254n, respectively. The Satellite communications system may operate as a bent-pipe system, where the satellite essentially operates as a repeater or bent pipe. Alternatively, the system may employ a switching or processing satellite supporting mesh communications (point-to-point communications directly between, for example, the two STs 234a and 234n).

In a bent-pipe system of an example embodiment, the satellite 232 operates as a repeater or bent pipe, and communications to and from the STs 234a-234n are transmitted over the satellite 232 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 232, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). More specifically, for a data communication from ST 234a to a public communications network 258 (e.g., the Internet), the ST 234a is associated with an IPGW (e.g., IPGW 248a(1)—selected from a pool of IPGWs available to the ST 234a, such as IPGWs 248a(1)-248a(7)—where the pool of IPGWs is a suitable subset of the IPGWs 248a(1)-248a(n) located at the GW 238a). The data is first transmitted, via the satellite 232, from the ST 234a to associated IPGW 248a(1). The IPGW 248a(1) determines the destination as being the Internet 258. The IPGW then repackages the data (e.g., as a TCP/IP communication), and routes the data communication, via the terrestrial link 264, to the Internet 258.

Figure 3A:
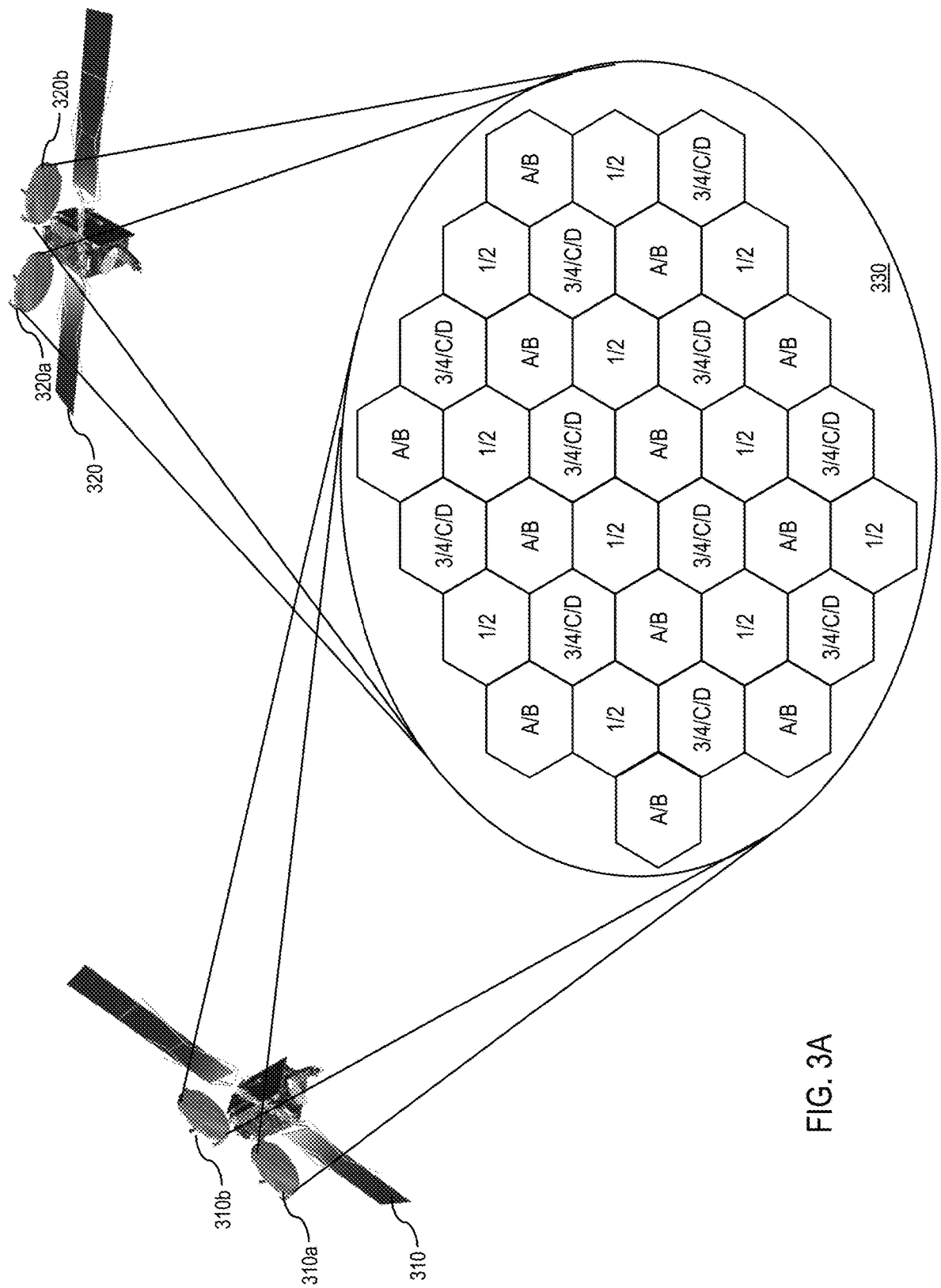
FIG. 3A illustrates a first satellite system employing two satellites, where the beams of the two satellites are interleaved over the cell coverage area to provide increased system capacity density, in accordance with example embodiments.
Figure 3B:
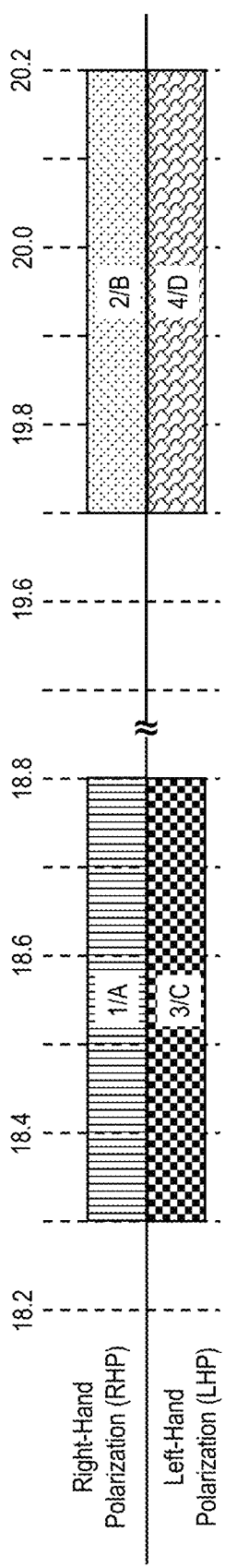
FIG. 3B illustrates frequency band and polarization assignments for the beams of FIG. 4A, in accordance with example embodiments.

FIG. 3A illustrates a first satellite system employing two satellites, where the beams of the two satellites are interleaved over the cell coverage area 330 to provide increased system capacity density, in accordance with example embodiments. Further, FIG. 3B illustrates frequency band and polarization assignments for the beams of FIG. 3A, in accordance with example embodiments. With reference to FIG. 3A, the satellite 310 (via the two downlink antennae 310a, 310b) transmits the downlink beams 1/2 and 3/4. Each beam 1/2 comprises the RHP for the Ka downlink frequency bands 18.3-18.8 GHz and 19.7-20.2 GHz (forming an aggregate of 1.0 GHz of spectrum for each such beam) and each beam 3/4 comprises the LHP for the Ka downlink frequency bands 18.3-18.8 GHz and 19.7-20.2 GHz (forming an aggregate of 1.0 GHz of spectrum for each such beam). Similarly, the satellite 320 (via the two downlink antennae 320a, 320b) transmits the downlink beams A/B and C/D. Each beam A/B comprises the RHP for the Ka downlink frequency bands 18.3-18.8 GHz and 19.7-20.2 GHz (forming an aggregate of 1.0 GHz of spectrum for each such beam) and each beam C/D comprises the LHP for the Ka downlink frequency bands 18.3-18.8 GHz and 19.7-20.2 GHz (forming an aggregate of 1.0 GHz of spectrum for each such beam). The beams 3/4/C/D are formed by overlapping a 3/4 beam from satellite 310 and a C/D beam from satellite 320. It then follows that each of the beams 1/2 and A/B comprises an aggregate of 1.0

GHz of spectrum per beam, whereas each beam 3/4/C/D comprises an aggregate of 2.0 GHz of spectrum per beam. In effect, therefore, this becomes a three-color reuse pattern, whereby, for each of the beams A/B, 1/2, 3/4/C/D, the nearest neighbor of the same frequency band beam is a distance of 3*r away, where r is the center-to-vertex radius of the hexagonal beam. Accordingly, the configuration of FIG. 3A facilitates the deployment of a three-color reuse pattern, using the frequency band and polarization assignments of a typical four-color reuse scheme (e.g., four 500 MHZ portions of spectrum, as shown in FIG. 3B), using only two antennas per satellite rather than three or four from a single antenna system. Further, as would be appreciated, the antennas may consist of fixed-beam and/or steerable-beam antennas implements via any appropriate technology for the desired antenna designs. With a steerable beam antenna, certain beams may be further interleaved or combined to provide increased capacity density in the respective geographical region covered by a beam or cell, provided that the applicable interference constraints are observed with regard to adjacent beams. Further, while the example embodiments described herein are with reference to satellite downlink beams and satellite downlink antennae, as would be recognized, the concepts of such embodiments similarly apply to, or can be employed relative to, satellite uplink beams and satellite uplink antennae.

With this configuration of the satellites 310 and 320, as shown in FIG. 3A, the beams of the two satellites are interleaved in a manner whereby each of the first two cells of a reuse group is provided an aggregate capacity of 1.0 GHz, and the third cell of each reuse group is provided an aggregate capacity of 2.0 GHz per beam, without sacrificing capacity of adjacent cells. Accordingly, given an available spectrum of 2 GHz per reuse group (separated into four 500 MHz components, as illustrated in FIG. 3B), the two satellite configuration of FIG. 3A provides an aggregate capacity of 4 GHz (1 GHz to each of two beams of the reuse group and 2 GHz to the third beam of the reuse group). More specifically, each satellite transmits two beams, with each beam providing one-half of the total available capacity or frequency spectrum (1,000 MHz per beam). Further, the beams of the two satellites are interleaved in a manner whereby one 1,000 MHz beam of each satellite is provided to each of two beams (1,000 MHz per each of two beams) of the reuse pattern and the second 1,000 MHz beam of each satellite is provided to the third beam of the reuse pattern (an aggregate of 2 GHz for the third beam). For example, each of the 1/2 and A/B beams is transmitted by the satellites 310 and 320 (respectively) via a combination of the 1 and 2 spectrum, and of the A and B spectrum, of FIG. 3B, which provides an aggregate of 1.0 GHz to each such 1/2 and A/B beam. Similarly, each of the 3/4 and C/D beams is transmitted by the satellites 310 and 320 together via a combination of the 3 and 4 spectrum of the first satellite, and of the C and D spectrum of the second satellite, of FIG. 3B, which provides an aggregate of 2.0 GHz to each such 3/4/C/D beam.

Accordingly, such an interleaving of the beams of the two satellites achieves an aggregate of 1 GHz and 2 GHz of spectrum or capacity within each of certain beams (based on the reuse pattern), without having to move capacity from adjacent beams (hence avoiding the sacrifice of the capacity thereto) or having to increase the power, size and capacity capability of a single satellite (hence avoiding exponential satellite and launch costs and satellite complexity). Moreover, the configuration of the present embodiment effectively enables a manageable and effective conversion of a four color reuse pattern (based on 4 respective bands of spectrum —RHP and LHP for 18.3-18.8 MHz and RHP and LHP for 19.7-20.2 MHz) to a three color reuse pattern, where each satellite implements two-thirds of the reuse or two-thirds of the beams.

Figure 3C:
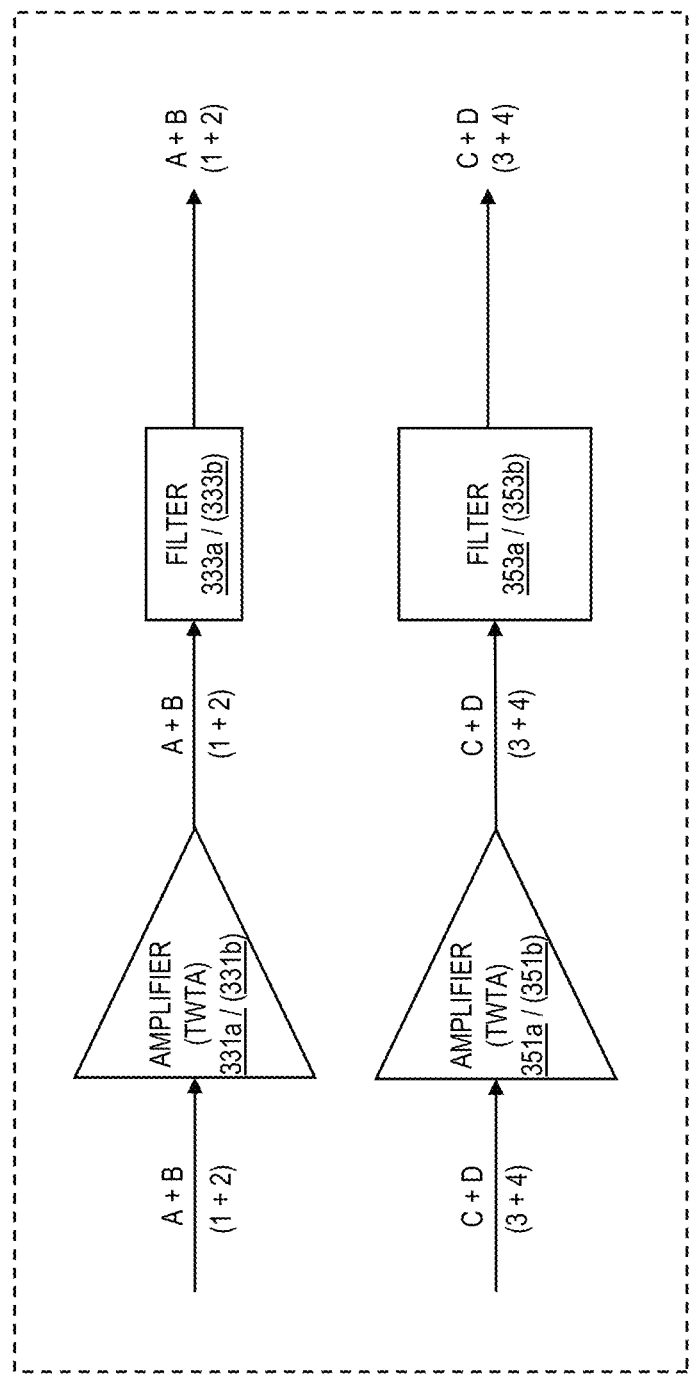
FIG. 3C illustrates a block diagram of two transmitters of a satellite downlink antenna, configured to transmit one set of the A/B and C/D (or 1/2 and 3/4) beams of the satellites of FIG. 3A, in accordance with example embodiments.

Further, FIG. 3C illustrates a block diagram of two transmitters of a satellite downlink antenna, configured to transmit one set of the A/B and C/D (or 1/2 and 3/4) beams of the satellite 310 (or 320) of FIG. 3A, in accordance with example embodiments of the present invention. With reference to FIG. 3A (as described above), each of the beams of each satellite reflects a respective aggregation or combination of certain portions of the spectrum shown in FIG. 3B. With this configuration, for example, each of the transmitters of the satellite 310 comprises an amplifier 331a, 351b (e.g., a traveling wave tube amplifier (TWTA)) and a filter 333a, 353a. For example, with regard to the satellite 310, the A and B beams of one satellite are amplified via the TWTA 331a and the C and D beams are amplified by the TWTA 351a. The amplified A+B and C+D beams are then fed into the filters 333a, 353a, respectively. Further, with regard to the satellite 320, the 1 and 2 beams of one satellite are amplified via the TWTA 331b and the 3 and 4 beams are amplified by the TWTA 351b. The amplified 1+2 and 3+4 beams are then fed into the filters 333b, 353b, respectively. In this case, however, each of the filters 333a and 353a of the satellite 310 need only generate the one beam A/B and C/D (respectively), each consisting of the respective combined spectrum portions A+B and C+D. Similarly, each of the filters 333b and 353b of the satellite 320 need only generate the one beam 1/2 and 3/4 (respectively), each consisting of the respective combined spectrum portions 1+2 and 3+4. Accordingly, with the configuration of FIG. 3A, the transmitters of the satellite downlink antennae can be implemented in a significantly more efficient and less complex manner, while still achieving the capacity density and other advantages, as discussed above. Moreover, the configuration of FIG. 3A achieves the capacity and lower complexity advantages, among others, with fewer antennae per satellite (e.g., 2 antennae per satellite as opposed to 4 antennae)—which achieves a significantly lower cost (and higher reliability) configuration in various contexts, including, among others, lower manufacturing costs, lower power requirements per satellite, significantly lower launch and insurance costs.

According to a further embodiment, as an alternative to the configuration of FIG. 3A, the respective beams can be implemented for each three-beam reuse group as a first beam consisting of the A/1 spectrum (combined from an "A" beam of the satellite 310 and a "1" beam from the satellite 320), a second beam consisting of the B/2 spectrum (combined from a "B" beam of the satellite 310 and a "2" beam from the satellite 320), and a third beam consisting of the 3/4/C/D spectrum (combined from a "C/D" beam of the satellite 310 and a "3/4" beam from the satellite 320). This configuration, however, would have the disadvantage that the beam pattern each satellite would require an increase in the number of antennas per satellite.

Figure 4A:
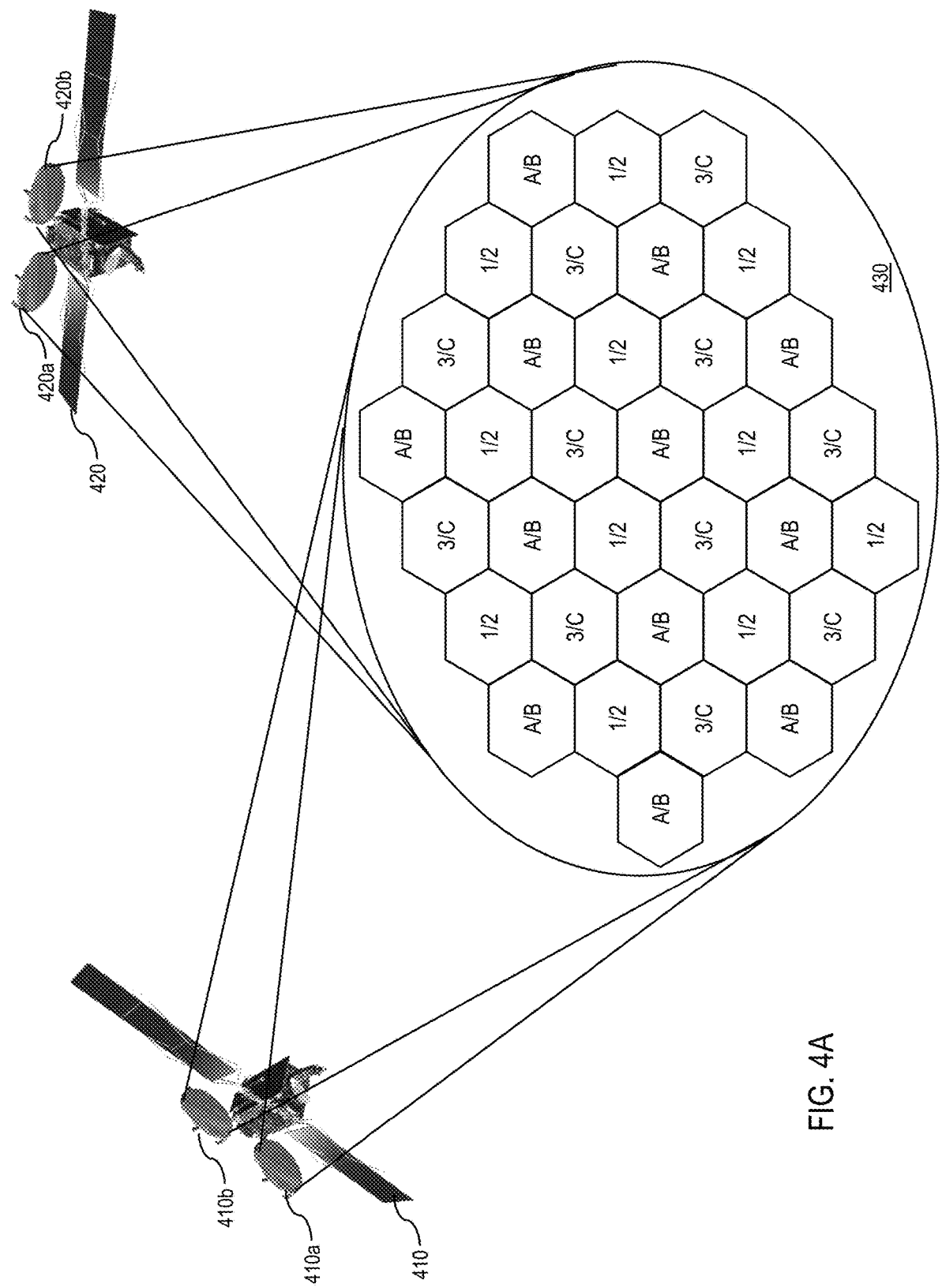
FIG. 4A illustrates a second satellite system employing two satellites, where the beams of the two satellites are interleaved over the cell coverage area to provide increased system capacity density, in accordance with example embodiments.
Figure 4B:
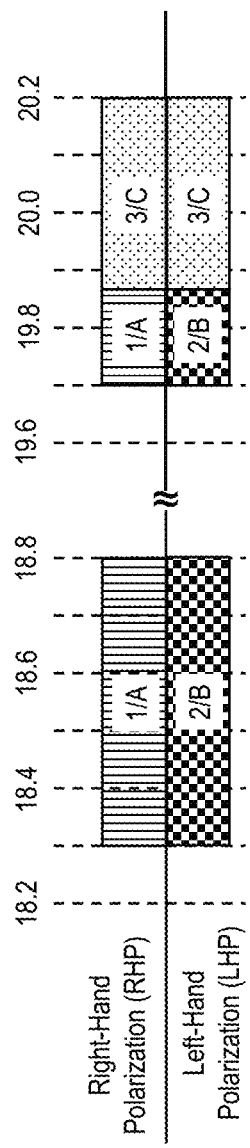
FIG. 4B illustrates frequency band and polarization assignments for the beams of FIG. 4A, in accordance with example embodiments.

FIG. 4A illustrates a second satellite system employing two satellites 410, 420. The beams of the two satellites are interleaved over the cell coverage area 430 to provide increased system capacity density, in accordance with example embodiments. Further, FIG. 4B illustrates frequency band and polarization assignments for the beams of FIG. 4A, in accordance with example embodiments. The polarizations consist of right-hand polarization (RHP) and left-hand polarization (LHP). With reference to FIGS. 4A and 4B, the satellite 410 (via the two downlink antennae

410a, 410b) transmits the downlink beams 1/2 and 3. Each beam 1/2 comprises the RHP and LHP for the Ka downlink frequency bands 18.3-18.8 GHz and 19.7-19.8667 GHz (forming an aggregate of 1.333 GHz of spectrum for each such beam) and each beam 3 comprises the RHP and LHP for the Ka downlink frequency band 19.8667-20.2 GHz (forming an aggregate of 666.667 MHz of spectrum for each such beam). Similarly, the satellite 420 (via the two downlink antennae 420a, 420b) transmits the downlink beams A/B and C. Each beam A/B comprises the RHP and LHP for the Ka downlink frequency bands 18.3-18.8 GHz and 19.7-19.8667 GHz (forming an aggregate of 1.333 GHz of spectrum for each such beam) and each beam 3 comprises the RHP and LHP for the Ka downlink frequency band 19.8667-20.2 GHz (forming an aggregate of 666.667 MHz of spectrum for each such beam).

With this configuration of the satellites 410 and 420, as shown in FIG. 4A, the beams of the two satellites are interleaved in a manner whereby each cell is provided an aggregate capacity of 1.333 GHz, whereby a total available spectrum of 2 GHz is configured to provide an aggregate bandwidth of 4 GHz. More specifically, each satellite employs a three color reuse pattern to provide one-third of the total available capacity or frequency spectrum via each of the three base beams. Further, the beams of the two satellites are interleaved in a manner to provide an aggregate of four-thirds of the available capacity via combinations of the three base beams of the two satellites. For example, each of the A/B beams is transmitted by the satellite 420 via a combination of the A and B spectrum of FIG. 4B, which provides an aggregate of 1.333 GHz to each such A/B beam. Further, each of the 1/2 beams is transmitted by the satellite 410 via a combination of the 1 and 2 spectrum of FIG. 4B, which provides an aggregate of 1.333 GHz to each such 1/2 beam. Additionally, each of the 3/C beams is transmitted by the satellites 410 and 420 via a combination of the 3 and C spectrum of FIG. 4B, which provides an aggregate of 1.333 GHz to each such 3/C beam. Accordingly, such an interleaving of the three color reuse pattern of the two satellites achieves an aggregate of 4 GHz of spectrum or capacity within each 3-beam reuse group (beams 1/2, A/B, 3/C), based on an available spectrum or capacity of only 2 GHz.

In effect, each satellite is eliminating one of the beams of its three color reuse pattern, and applying the capacity of that eliminated beam to one of the other beams of the pattern. Thereby, one beam of the pattern of each satellite is providing two-thirds of the available spectrum or capacity and another beam is providing one third. The interleaving of the beams then applies the available spectrum of each satellite as an overall three color reuse pattern, whereby two-thirds of the spectrum of one satellite is applied to a first beam/cell of the reuse pattern, two-thirds of the spectrum of the other satellite is applied to a second beam/cell of the reuse pattern, and one-third of the spectrum of each satellite is combined to form two-thirds of the spectrum that is applied to the third beam of the reuse pattern. In this manner, an aggregate capacity of two thirds of the available spectrum is applied to each beam of the reuse group—amounting to an aggregate capacity for each reuse group of six-thirds or twice the available spectrum. Further, each satellite need provide only two-thirds the number of beams and pathways through the satellite.

Figure 5A:
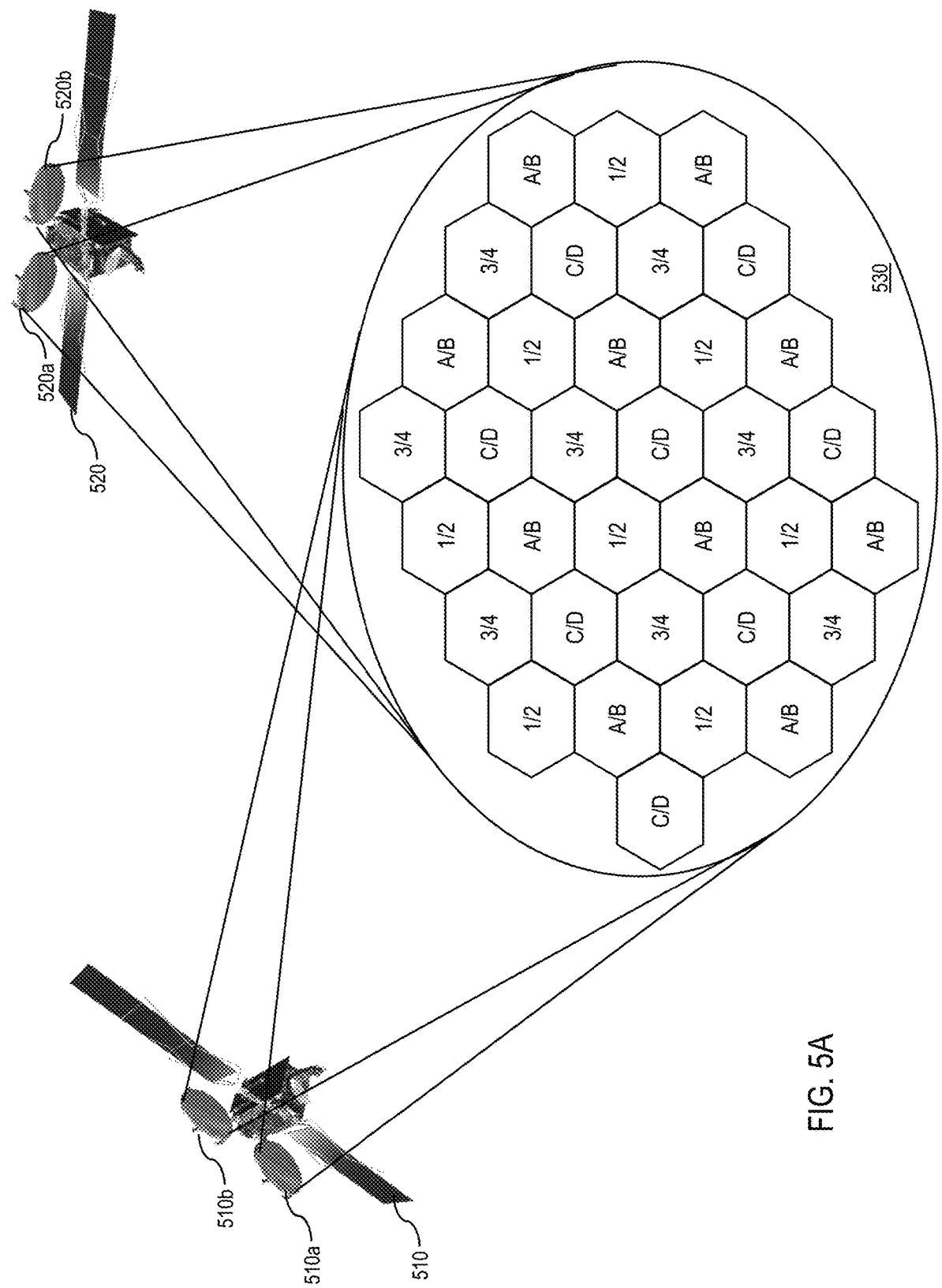
FIG. 5A illustrates a third satellite system employing two satellites, where the beams of the two satellites are interleaved over the cell coverage area to provide increased system capacity density, in accordance with example embodiments.
Figure 5B:
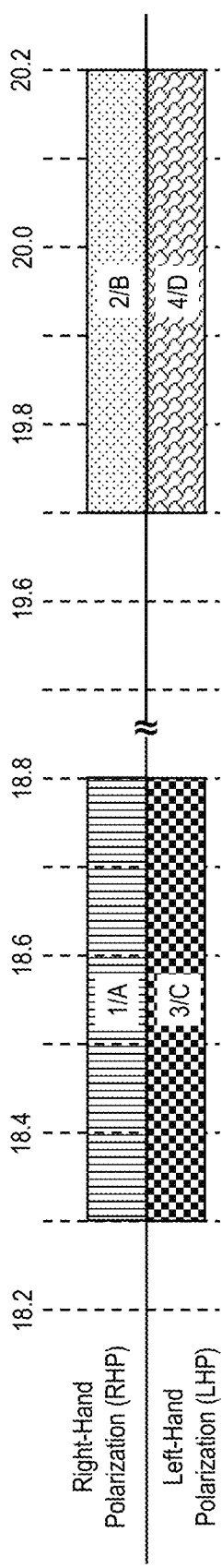
FIG. 5B illustrates frequency band and polarization assignments for the beams of FIG. 5A, in accordance with example embodiments.

According to a further embodiment, FIG. 5A illustrates a third satellite system employing two satellites 510, 520, where the beams of the two satellites are interleaved over the cell coverage area 530 to provide increased system capacity density, in accordance with example embodiments. Further, FIG. 5B illustrates frequency band and polarization assignments for the beams of FIG. 5A, in accordance with example embodiments. With reference to FIGS. 5A and 5B, the satellite 510 (via the two downlink antennae 510a, 510b) transmits the downlink beams 1/2 and 3/4. Each beam 1/2 comprises the RHP for the Ka downlink frequency bands 18.3-18.8 GHz and 19.7-20.2 GHz (forming an aggregate of 1000 MHz of spectrum for each such beam) and each beam 3/4 comprises the LHP for the Ka downlink frequency bands 18.3-18.8 GHz and 19.7-20.2 GHz (forming an aggregate of 1000 MHz of spectrum for each such beam). Similarly, the satellite 520 (via the two downlink antennae 520a, 520b) transmits the downlink beams A/B and C/D. Each beam A/B comprises the RHP for the Ka downlink frequency bands 18.3-18.8 GHz and 19.7-20.2 GHz (forming an aggregate of 1000 MHz of spectrum for each such beam) and each beam C/D comprises the LHP for the Ka downlink frequency bands 18.3-18.8 GHz and 19.7-20.2 GHz (forming an aggregate of 1000 MHz of spectrum for each such beam).

With this configuration of the satellites 510 and 520, as shown in FIG. 5A, the beams of the two satellites are interleaved in a manner whereby each cell is provided an aggregate capacity of 1.0 GHz, without sacrificing capacity of adjacent cells. More specifically, each satellite employs a four color reuse pattern to provide one-fourth of the total available capacity or frequency spectrum via each of the four base beams (500 MHz per beam). Further, the beams of the two satellites are interleaved in a manner to provide an aggregate of one-half of the available capacity via combinations of the four base beams of the two satellites. For example, each of the 1/2 and 3/4 beams is transmitted by the satellite 510 via a combination of the 1 and 2 spectrum, and of the 3 and 4 spectrum, of FIG. 5B, which provides an aggregate of 1.0 GHz to each such 1/2 and 3/4 beam. Similarly, each of the A/B and C/D beams is transmitted by the satellite 520 via a combination of the A and B spectrum, and of the C and D spectrum, of FIG. 5B, which provides an aggregate of 1.0 GHz to each such A/B and C/D beam. Accordingly, such an interleaving of the four color reuse pattern of the two satellites achieves an aggregate of 1 GHz of spectrum or capacity within each beam, without having to move capacity from adjacent beams (hence avoiding the sacrifice of the capacity thereto) or having to increase the power, size and capacity capability of a single satellite (hence avoiding exponential satellite and launch costs and satellite complexity).

Figure 6A:
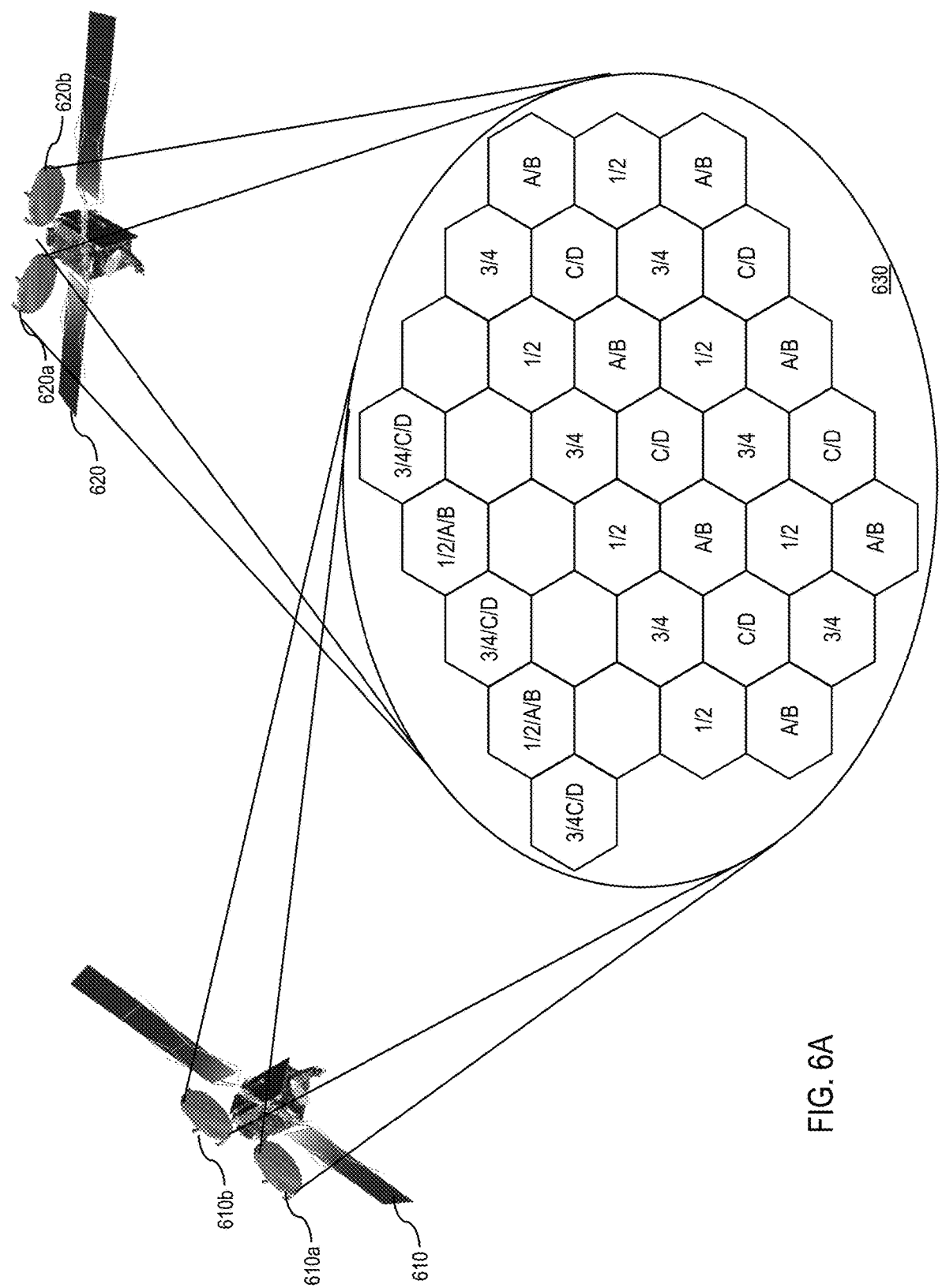
FIG. 6A illustrates a fourth satellite system employing two satellites, where the beams of the two satellites are interleaved over the cell coverage area to provide increased system capacity density, in accordance with example embodiments.
Figure 6B:
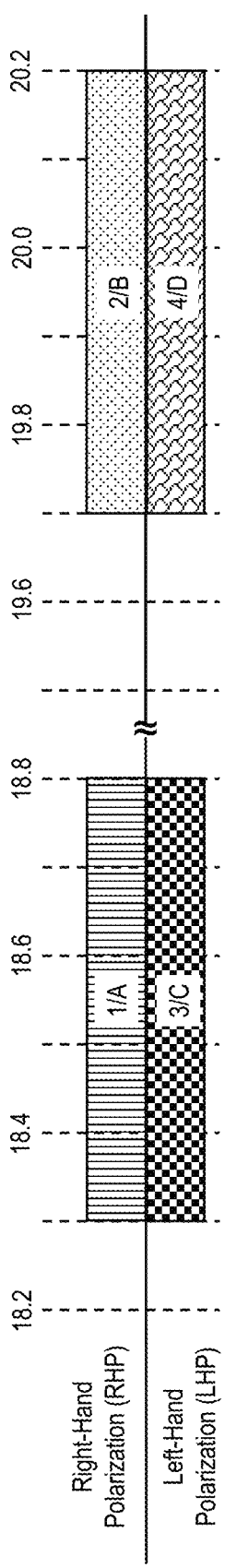
FIG. 6B illustrates frequency band and polarization assignments for the beams of FIG. 6A, in accordance with example embodiments.

According to a further embodiment, FIG. 6A illustrates a fourth satellite system employing two satellites 610, 620, where the beams of the two satellites are interleaved over the cell coverage area 630 to provide increased system capacity density, in accordance with example embodiments. Further, FIG. 6B illustrates frequency band and polarization assignments for the beams of FIG. 6A, in accordance with example embodiments. With reference to FIGS. 6A and 6B, the satellite 610 (via the two downlink antennae 610a, 610b) transmits the downlink beams 1/2 and 3/4. Each beam 1/2 comprises the RHP for the Ka downlink frequency bands 18.3-18.8 GHz and 19.7-20.2 GHz (forming an aggregate of 1000 MHz of spectrum for each such beam) and each beam 3/4 comprises the LHP for the Ka downlink frequency bands 18.3-18.8 GHz and 19.7-20.2 GHz (forming an aggregate of 1000 MHz of spectrum for each such beam). Similarly, the satellite the satellite 620 (via the two downlink antennae 620a, 620b) transmits the downlink beams A/B and C/D. Each beam A/B comprises the RHP for the Ka downlink frequency bands 18.3-18.8 GHz and 19.7-20.2 GHz (forming an aggregate of 1000 MHz of spectrum for each such beam) and each beam C/D comprises the LHP for the Ka downlink frequency bands 18.3-18.8 GHz and 19.7-20.2 GHz (forming an aggregate of 1000 MHz of spectrum for each such beam).

With this configuration of the satellites 610 and 620, as shown in FIG. 6A, the beams of the two satellites are interleaved in a manner whereby each cell is provided an aggregate capacity of 1.0 GHz, without sacrificing capacity of adjacent cells. More specifically, each satellite employs a four color reuse pattern to provide one-fourth of the total available capacity or frequency spectrum via each of the four base beams (500 MHz per beam). Further, in respective cells within the cell coverage area 630, the beams of the two satellites are interleaved in different manners to achieve an un-balanced capacity density layout. By way of example, as illustrated in the Figure, using steerable antenna technology, the beams 1/2/A/B and 3/4/C/D of certain cells are interleaved to provide 100% of the available capacity (2 GHz) to each such beam. With this layout, however, in order not to violate spectrum reuse restrictions, no capacity is provided to certain adjacent cells (the blank cells of the Figure). By way of further example, as also illustrated in the Figure, the beams of the two satellites are interleaved in a manner to provide an aggregate of one-half of the available capacity to certain other cells via combinations of the four base beams of the two satellites (as provided by the embodiment of FIG. 5A). Namely, each of the 1/2 and 3/4 beams is transmitted by the satellite 610 via a combination of the 1 and 2 spectrum, and of the 3 and 4 spectrum, of FIG. 6B, which provides an aggregate of 1.0 GHz to each such 1/2 and 3/4 beam. Similarly, each of the A/B and C/D beams is transmitted by the satellite 620 via a combination of the A and B spectrum, and of the C and D spectrum, of FIG. 6B, which provides an aggregate of 1.0 GHz to each such A/B and C/D beam. Accordingly, an aggregate of 1 GHz of available spectrum or capacity is achieved within each such beam, without having to move capacity from adjacent beams (hence avoiding the sacrifice of the capacity thereto) or having to increase the power, size and capacity capability of a single satellite (hence avoiding exponential satellite and launch costs and satellite complexity).

Figure 1A:
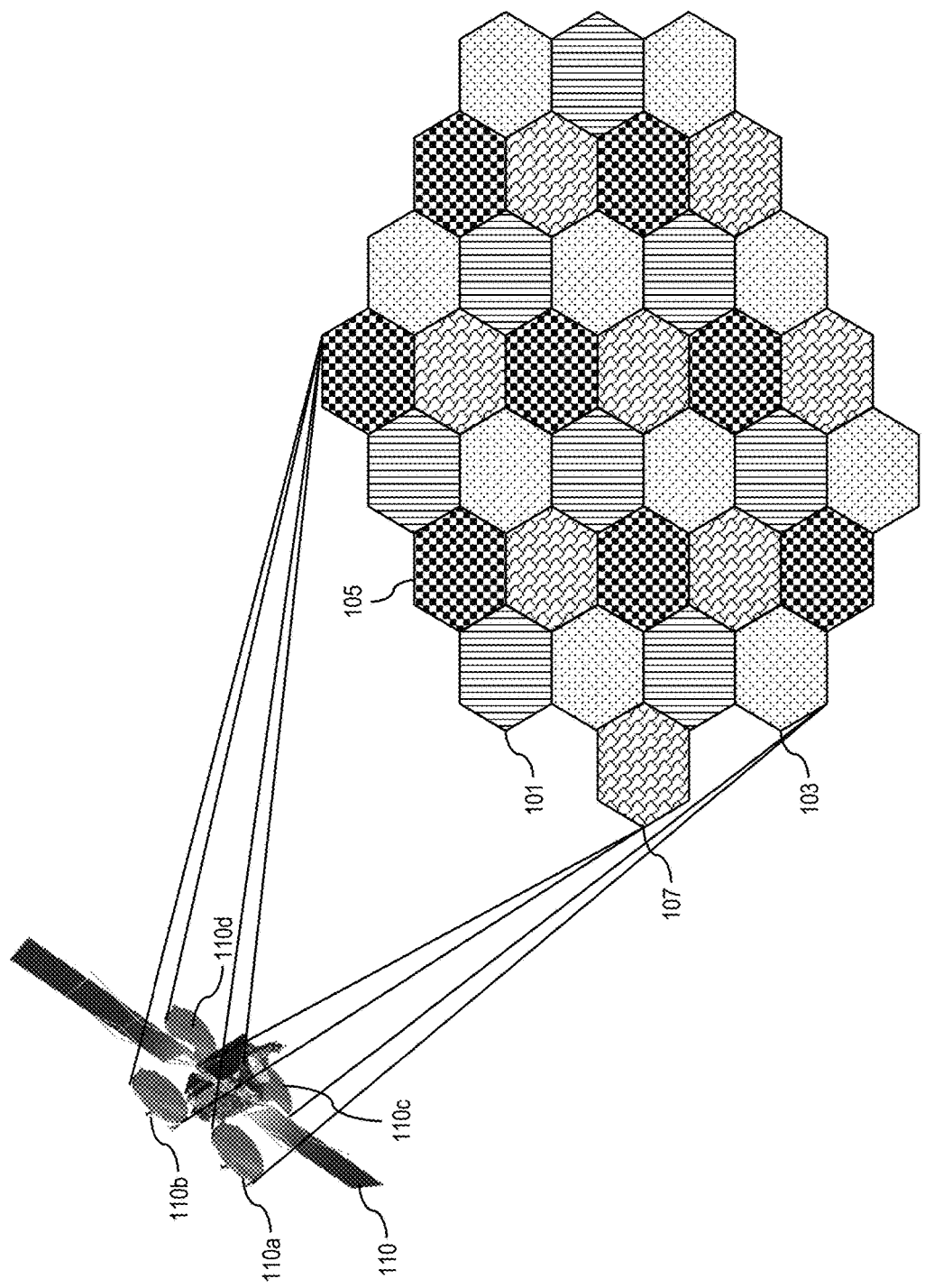
FIG. 1A illustrates a typical 4-beam reuse cell pattern or plan for a satellite communications system.
Figure 1B:
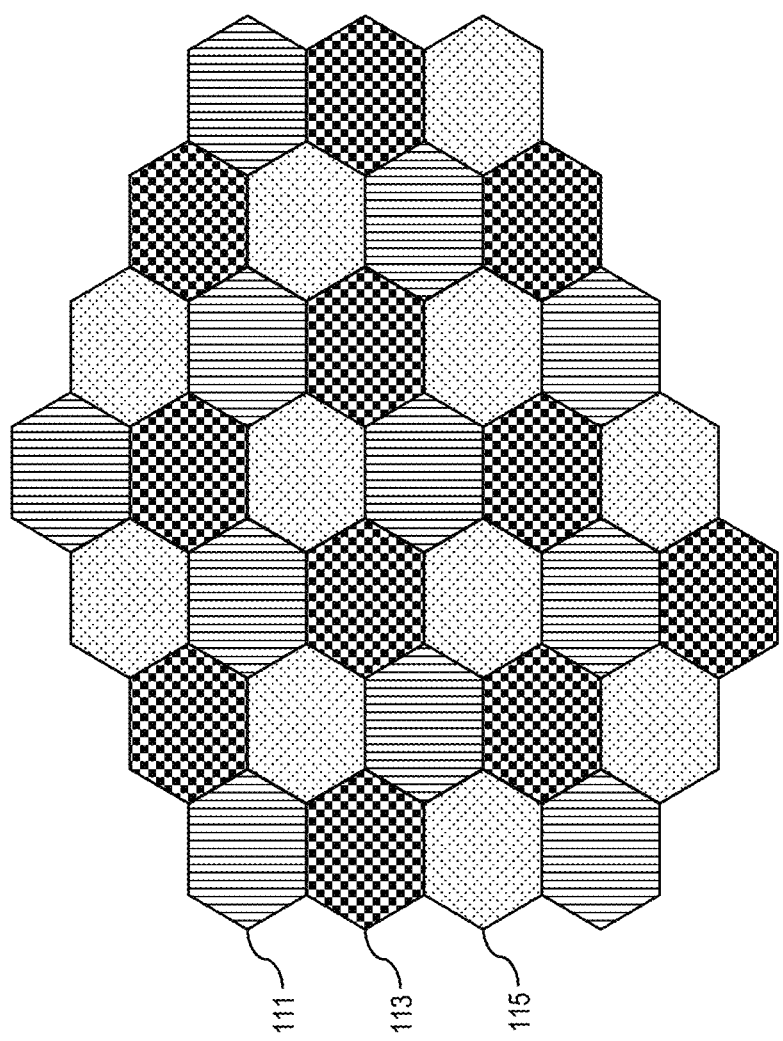
FIG. 1B illustrates a typical 3-beam reuse cell pattern or plan for a satellite communications system.
Figure 1C:
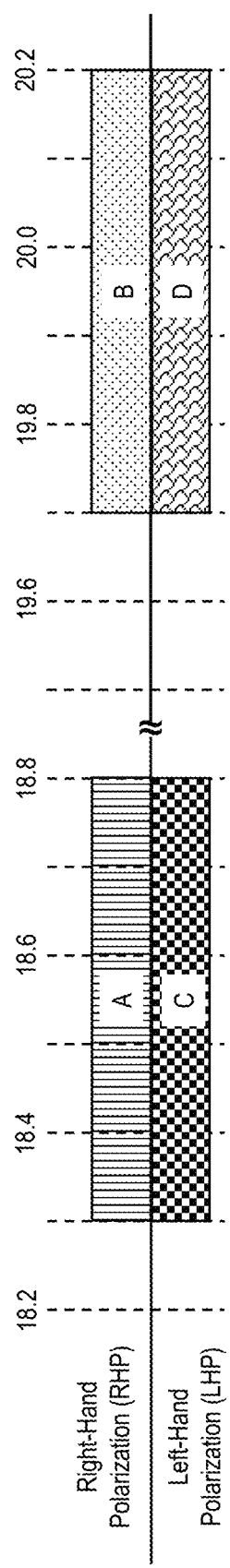
FIG. 1C illustrates typical frequency band and polarization assignments for the beams of FIG. 1A.
Figure 1D:
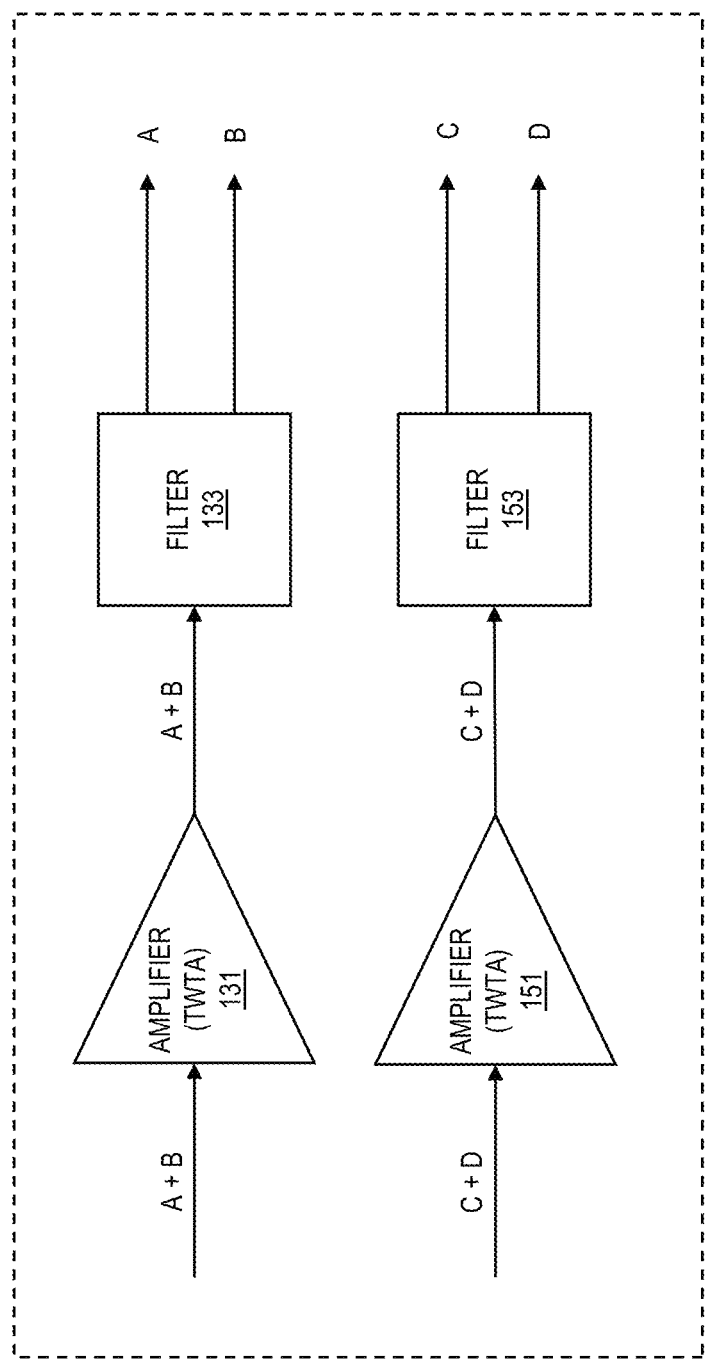
FIG. 1D illustrates a block diagram of a typical configuration for two transmitters of a satellite downlink antenna, configured to transmit one set of the A, B, C, D (or 1, 2, 3, 4) beams of a four-color reuse pattern.
Figure 1E:
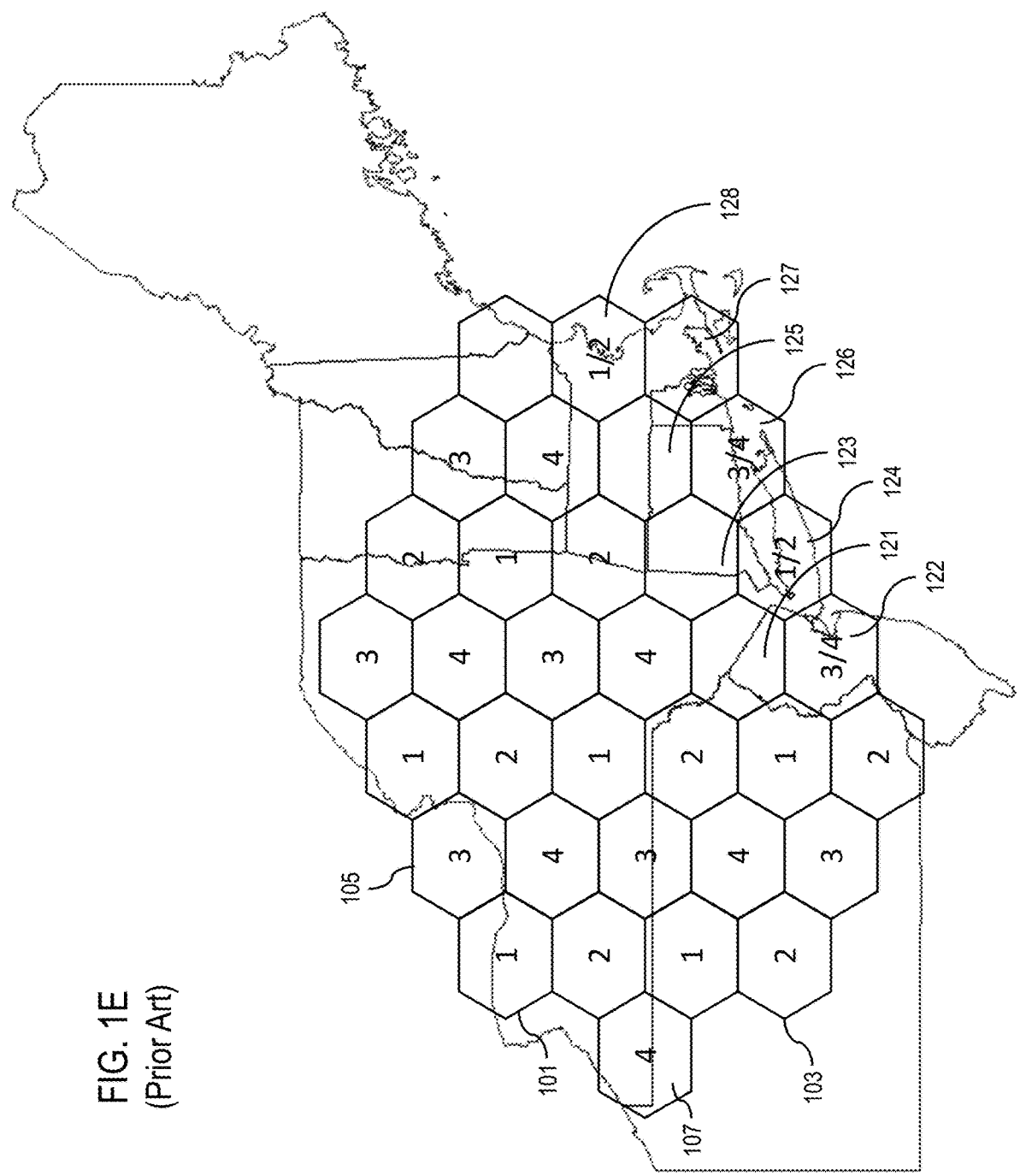
FIG. 1E illustrates the four pattern reuse plan of FIG. 1A, where the cell or beam pattern has been overlaid on a map of the Northeastern United States.

Further, with regard to the antenna requirements for each satellite, the number and size of the beams, and the employed reuse pattern, will determine the number of antennae required for each satellite. As would be recognized by one of skill in the art, the physical constraints of satellite technology limits the number and size of beams, and the reuse pattern, achievable by a single antenna. For example, in order to achieve the desired beam capacity density, with the four-color reuse pattern of FIG. 1A (for example), a minimum of three antennae (and possible even four antennae) would be required on the one satellite. By contrast, the increased capacity density and three-color reuse pattern of the embodiment of FIG. 3A or the four-color reuse pattern of the embodiment of FIG. 5A (for example) could be achieved with two antennae on each satellite. One basis for the reduction in required antennae is that each satellite requires fewer beams to achieve the desired capacity density. Alternatively, such embodiments of the present invention may also be achieved with only one antenna per satellite—however, as would be recognized by one of skill in the art, such a one antenna per satellite configuration would result in a tradeoff in reduced performance. Accordingly, such a design significantly reduces the size and complexity of each satellite, which in turn reduces satellite costs. Further, the reduction in size and complexity consequently also significantly reduces launch costs (including respective launch insurance costs).

According to example embodiments, with regard to the design of the satellite antennae, for the generation of multiple spot beams per antenna, various different antenna designs may be employed. According to one embodiment, a single feed per beam (SFB) design may be employed, where one feed horn is used for each spot beam. This approach has the advantages of hardware simplicity and a slightly better electrical performance, but at the expense of an increased number of apertures depending on the number of beams and the employed reuse pattern. Additionally, designs using a single oversize shaped reflector, or passive or active lenses, may also be employed. According to a further embodiment, a multiple feeds per beam (MFB) design, or phased array, may be employed, which uses small sub-arrays of antenna elements for each spot beam. In a phased array antenna, the radio frequency current from the transmitter is fed to the individual antenna elements with the correct phase relationship so that the radio waves from the separate antenna elements add together to increase the radiation and form a beam in a desired direction. The elements of the phased array are fed by a complex orthogonal beam forming network. Single feed per beam and phased array antenna technologies are well known in the art.

According to further example embodiments, with regard to the system gateways (as discussed with regard to FIG. 2), in systems that employ multiple satellites, with the interleaving beams to increase capacity density, such embodiments facilitate a reduction in the number of gateway locations by a factor corresponding to the number of satellites deployed in the system. Each gateway location can service multiple satellites via a respective radio frequency terminal (RFT) for each satellite, and scalable computing resources within the respective IP gateways, to service the user capacity of the associated terminals. Each gateway location could service the user capacity of the associated satellite terminals and the multiple satellites, sharing the land, buildings and building resources (e.g., power, air conditioning, manpower, security, etc.), network points of presence (POPs), etc. More specifically, a single gateway location can employ the same satellite spectrum to achieve the required gateway bandwidth levels with respect to each satellite, without violating spectrum reuse constraints on a per satellite basis. For example, the two satellite approach of the three-color reuse embodiment of FIG. 3A and the four-color reuse embodiment of FIG. 5A can be fully supported by the same number of gateways as the prior art four-color reuse approach of FIG. 1A, but requiring only half the number of gateway locations (each gateway location services twice the capacity via the two satellites). In other words, the increased capacity density achieved via the multiple satellite embodiments of the present invention can be serviced by the same number of gateways at fewer gateway locations as compared to the number of gateway locations required for the conventional single satellite system at the respective reduced capacity density levels.

According to further example embodiments, with regard to the satellite terminals, a single ST can be employed that is capable of pointing to and tuning into the spectrum of, for example, two satellites transmitting a beam to a respective cell, and thereby receiving the full capacity spectrum of the two satellites. By way of example, depending on the orbital location of each of the two satellites, where the ST antenna can point to both satellites simultaneously, a phased array antenna may be used on the ST to receive the spectrum of the interleaved beams from both satellites. By way of further example, the ST may employ two single feed antennas, with each pointing at a respective on of the two satellites.

Further, according to example embodiments of the present invention, the antenna arrays of each satellite antenna would be designed and manufactured in relation to each-other. In other words, with the antennas in a two satellite system (for example), the elements of the antenna of one satellite would be designed and manufactured in relation to the elements of the corresponding antenna of the second satellite in order to provide for consistency in the beam coverage for the interleaving of the respective beams of the antennas of each of the satellites. More specifically, in the embodiment of FIG. 3A (for example), for a particular 3/4/C/D cell, the antenna elements that generate a particular 3/4 beam from one satellite and the antenna elements that generate the respective C/D beam from the other satellite (where the respective 3/4 and C/D beams are to interleaved for the intended reuse pattern) are designed in relation to each other such that they overlap in a relatively coincident or coextensive manner, exhibit a complimentary carrier to interference ratio (C/I), etc. Similarly, the antenna elements that generate a particular 1/2 beam from one satellite and the antenna elements that generate a particular A/B beam from the other satellite (where the respective 1/2 and A/B beams are adjacent to each other for the intended reuse pattern) are designed in relation to each other such that they fit within the reuse pattern (e.g., in a contiguous manner) to generate the desired overall cell pattern on the ground. In this context, the elements of each antenna of the first satellite and the elements of each antenna of the second satellite are designed with respect to or in relation to each other in order to generate the desired cell reuse pattern on the ground (taking into account antenna design factors that affect the beam generation and respective cell pattern on the ground, including the different orbital slots of the two satellites).

Various alternative embodiments are also possible without departing from the general scope of the present invention, provided that no interleaving or aggregation of spectrum to a given cell violates the frequency separation or reuse restrictions within a single satellite. As one example, each satellite may provide only half the total number of beams (e.g., each satellite need not provide every two-thirds and one-third beam. As a further example, the beam interleaving, according to example, embodiments can be extended to three satellites, each providing a single full capacity beam of the reuse pattern. In such a system, each beam would provide the full 2 GHz of available spectrum, with the three beams of the three respective satellites being interleaved in a three-color reuse pattern.

According to further variations of the foregoing embodiments, the patterns can be aligned to be completely overlapping, completely non-overlapping, or anything in-between. Further, there can be areas in the overall coverage area where the three colors in a reuse pattern can be provided by a single, two, or three satellites.

According to a further embodiment, a four-color reuse scheme can be employed using up to four satellites to provide all of the bandwidth to each coverage area.

According to a further embodiments, higher capacity density can be provided to an area by increasing the antenna size on the satellite. Considering the reduction of the number of antennae per satellite achieved in accordance with example embodiments of the present invention, each antenna can be made larger. With the larger antenna size, the beams can be made smaller and the number of beams can be increased, which thus provides for more reuse opportunities and a greater level of overall bandwidth. Further, the larger antenna size results in higher gain, which in turn reduces the required power or amplification per beam.

Accordingly, the various multiple satellite and beam pattern embodiments of the present invention thereby provide for selective allocation of capacity amongst the cells of a geographic region, smaller, less complex, reduced antennae satellite configurations. Further, these embodiments achieve such selective allocation of capacity, or allocation or optimization of capacity density, utilizing fewer gateway sites than single satellite configurations. Moreover, in view of the reduction in antennae requirements on each satellite, each antenna may be enlarged in order to further improve or optimize capacity density/allocation.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
generating, by a first satellite, a first plurality of spot beams for a first frequency reuse plan based on a plurality of radio frequency (RF) spectrum bands;
generating, by a second satellite, a second plurality of spot beams for a second frequency reuse plan based on the plurality of RF spectrum bands; and
interleaving the first plurality of spot beams and the second plurality of spot beams to generate an aggregate frequency reuse cell plan; and
wherein, according to the aggregate frequency reuse plan, (i) a geographic area of each of a first plurality of cells is covered by a combination of at least two of the plurality of spot beams of the first satellite, (ii) a geographic area of each of a second plurality of cells is covered by a combination of at least two of the plurality of spot beams of the second satellite, and (iii) a geographic area of each of a third plurality of cells is covered by a combination of at least one of the plurality of spot beams of the first satellite and at least one of the plurality of spot beams of the second satellite.

2. The method of claim 1, wherein, according to the aggregate frequency reuse cell plan, the geographic area of each of the third plurality of cells is covered by a combination of at least two of the plurality of spot beams of the first satellite and at least two of the plurality of spot beams of the second satellite.

3. The method of claim 1, wherein, according to the aggregate frequency reuse cell plan, the geographic area of each of the third plurality of cells is covered by a combination of at least a first two of the plurality of spot beams of the first satellite and at least a first two of the plurality of spot beams of the second satellite, and a geographic area of each of a fourth plurality of cells is covered by a combination of at least a second two of the plurality of spot beams of the first satellite and at least a second two of the plurality of spot beams of the second satellite.

4. A system comprising:
   a first satellite, including at least one antenna configured to generate a first plurality of spot beams that form a first frequency reuse plan based on a plurality of radio frequency (RF) spectrum bands;
   a second satellite, including at least one antenna configured to generate a second plurality of spot beams that form a second frequency reuse plan based on the plurality of RF spectrum bands; and
   wherein the at least one antenna of the first satellite and the at least one antenna of the second satellite are further configured to generate the first plurality of spot beams and the second plurality of spot beams, respectively, in an interleaved manner to generate an aggregate frequency reuse cell plan; and
   wherein, according to the aggregate frequency reuse cell plan, (i) a geographic area of each of a first plurality of cells is covered by a combination of at least two of the plurality of spot beams of the first satellite, (ii) a geographic area of each of a second plurality of cells is covered by a combination of at least two of the plurality of spot beams of the second satellite, and (iii) a geographic area of each of a third plurality of cells is covered by a combination of at least one of the plurality of spot beams of the first satellite and at least one of the plurality of spot beams of the second satellite.

5. The system of claim 4, wherein, according to the aggregate frequency reuse cell plan, the geographic area of each of the third plurality of cells is covered by a combination of at least two of the plurality of spot beams of the first satellite and at least two of the plurality of spot beams of the second satellite.

6. The system of claim 4, wherein, according to the aggregate frequency reuse cell plan, the geographic area of each of the third plurality of cells is covered by a combination of at least a first two of the plurality of spot beams of the first satellite and at least a first two of the plurality of spot beams of the second satellite, and a geographic area of each of a fourth plurality of cells is covered by a combination of at least a second two of the plurality of spot beams of the first satellite and at least a second two of the plurality of spot beams of the second satellite.

* * * * *